(12) United States Patent
Kimelman et al.

(10) Patent No.: US 7,805,550 B2
(45) Date of Patent: Sep. 28, 2010

(54) MANAGEMENT OF POLLING LOOPS IN A DATA PROCESSING APPARATUS

(75) Inventors: Paul Kimelman, Alamo, CA (US); Richard Roy Grisenthwaite, Cambridge (GB)

(73) Assignee: ARM Limited, Cambridge (GB)

( * ) Notice: Subject to any disclaimer, the term of this patent is extended or adjusted under 35 U.S.C. 154(b) by 1222 days.

(21) Appl. No.: 11/032,226

(22) Filed: Jan. 11, 2005

(65) Prior Publication Data

US 2005/0268001 A1 Dec. 1, 2005

(30) Foreign Application Priority Data

May 26, 2004 (GB) ................... 0411792.5

(51) Int. Cl.
*G06F 3/00* (2006.01)
*G06F 15/16* (2006.01)
*G06F 15/00* (2006.01)

(52) U.S. Cl. ..................... 710/46; 710/44; 709/208; 712/32

(58) Field of Classification Search ............. 710/46; 709/208; 712/32
See application file for complete search history.

(56) References Cited

U.S. PATENT DOCUMENTS 5,623,677 A * 4/1997 Townsley et al. ............ 713/310

FOREIGN PATENT DOCUMENTS

| JP | A 11-284642 | 10/1999 |
| JP | A 2000-029088 | 1/2000 |
| JP | A 2002-141920 | 5/2002 |
| JP | A 2002-202834 | 7/2002 |
| WO | WO 2004/006097 | 1/2004 |

OTHER PUBLICATIONS

Translation of Japanese official action, Apr. 27, 2010, in corresponding Japanese Application No. 2005-152188.

* cited by examiner

*Primary Examiner*—Henry W. H. Tsai
*Assistant Examiner*—Juanito C Borromeo
(74) *Attorney, Agent, or Firm*—Nixon & Vanderhye P.C.

(57) ABSTRACT

A data processing apparatus and method are provided for managing polling loops. The data processing apparatus comprises a main processing unit and a subsidiary processing unit operable to perform a task on behalf of the main processing unit. The subsidiary processing unit is operable to set a completion field when the task has been completed and the main processing unit is operable to poll the completion field in order to determine whether the task has been completed. If on polling the completion field a threshold number of times the main processing unit determines that the task has not been completed, the main processing unit is operable to enter a power saving mode. The subsidiary processing unit is operable, when the task has been completed, to cause a notification to be issued on a path interconnecting the main processing unit and the subsidiary processing unit. The main processing unit is arranged, upon receipt of the notification to exit the power saving mode. This provides a particularly efficient technique for managing a polling loop within the data processing apparatus.

24 Claims, 4 Drawing Sheets

```
try
    LDR r1, [flag]
    CMP r1, #1
    WFENE
    BNE try
```

Fig. 4

MANAGEMENT OF POLLING LOOPS IN A DATA PROCESSING APPARATUS

FIELD

The present invention relates to a data processing apparatus and method for managing polling loops.

BACKGROUND

As data processing tasks increase in complexity, it is becoming more common for data processing systems to include more than one processing unit to handle the performance of these tasks. In particular, in addition to main processing logic, for example a central processing unit (CPU), it is often the case that a number of additional pieces of special purpose hardware logic are provided for performing particular tasks. Examples of such additional hardware units, or subsidiary processing units as they are also referred to herein, are data accelerators such as those used to perform certain video processing functions, Direct Memory Access (DMA) controllers, Liquid Crystal Display (LCD) controllers, etc.

When the main processing unit delegates a particular task to one of the subsidiary processing units, it will typically be necessary for the main processing unit to determine when that task has been completed by the subsidiary processing unit. One known way to achieve this is to arrange the subsidiary processing unit to set a flag when it has completed the task, and for the main processing unit to be arranged to periodically poll that flag in order to determine whether the flag has been set, and accordingly determine whether the task has been completed. The flag will continue to be polled periodically in a polling loop until it is determined that the flag has been set.

There are a number of problems with such an approach. Firstly, dependent on the time taken for the subsidiary processing logic to perform the task, it will be appreciated that the main processing logic may need to poll the flag a significant number of times. In a system where low power consumption is desirable, this repeated polling of the flag is undesirable because energy is being consumed to no useful effect. Furthermore, it is often the case that the piece of memory in which the flags are maintained is accessible via a common bus interconnecting the main processing unit, subsidiary processing unit(s) and memory. Each time the main processing unit wishes to poll the flag, it needs to request access to the bus, and this hence increases the likelihood of contention arising between the various processing units seeking access to the bus.

Accordingly, it would be desirable to provide an improved technique for managing such polling loops.

SUMMARY

Viewed from a first aspect, a data processing apparatus comprises a main processing unit; a subsidiary processing unit operable to perform a task on behalf of the main processing unit; the subsidiary processing unit being operable to set a completion field when said task has been completed and the main processing unit being operable to poll the completion field in order to determine whether said task has been completed; if on polling the completion field a threshold number of times the main processing unit determines that the task has not been completed, the main processing unit being operable to enter a power saving mode; the subsidiary processing unit being operable, when said task has been completed, to cause a notification to be issued on a path interconnecting the main processing unit and the subsidiary processing unit; the main processing unit being operable, upon receipt of said notification, to exit said power saving mode.

If the subsidiary processing unit is performing a task on behalf of the main processing unit, the main processing unit is arranged to poll the completion field in order to determine whether the task has been completed. If on polling the completion field a threshold number of times the main processing unit determines that the task has not been completed, the main processing unit is arranged to enter a power saving mode. Whilst in this power saving mode, the main processing unit does not continue to poll the completion field, and accordingly consumes significantly less power than would otherwise be the case. Furthermore, during this power saving mode, the main processor will not be issuing any bus access requests that may typically be required when polling the completion field, and accordingly this will reduce the likelihood of contention on the bus.

Furthermore, when the subsidiary processing unit has completed the task, it is arranged to cause a notification to be issued on a path interconnecting the main processing unit and the subsidiary processing unit. Upon receipt of the notification by the main processing unit, the main processing unit is then operable to exit the power saving mode. Hence, this notification is used as a mechanism to cause the main processing unit to "wake up" from the power saving mode. It has been found that this approach enables significant power savings to be achieved within the data processing apparatus.

The threshold number of times that the completion field is polled before the main processing unit decides to enter the power saving mode can be selected dependent on the embodiment. Hence, as an example, the main processing unit may be arranged such that if on polling the completion field once it is determined that the task has not been completed then the power saving mode is entered. In one particular embodiment, the main processing unit is arranged to enter the power saving mode if the completion field has been polled twice and still it is determined that the task has not been completed.

It will be appreciated that the path interconnecting the main processing unit and the subsidiary processing unit for the purpose of transmitting the notification can take a variety of forms. In one embodiment, the path comprises a dedicated path for the transfer of the notification between the subsidiary processing unit and the main processing unit, in order to ensure that there is no delay in the propagation of the notification.

In one particular embodiment, the subsidiary processing unit is operable on completion of the task to issue an interrupt signal to the main processing unit over an interrupt path, said path interconnecting the main processing unit and the subsidiary processing unit incorporating the interrupt path, and the notification being derived from the interrupt signal. The interrupt path is by its nature a low latency path. In embodiments where an interrupt signal is issued on completion of the task, the deriving of the notification from the interrupt signal provides a particularly efficient technique for transmitting the notification to the main processing unit, since the pre-existing interrupt path can be used for the propagation of the notification to the main processing unit. This hence avoids the need to provide an additional output pin on the subsidiary processing unit, the subsidiary processing unit merely needing to issue the interrupt signal in its usual manner.

The main processing unit may be programmable to either enable or disable interrupt processing in response to the interrupt signal. If interrupt processing is disabled, then it is apparent that the main processing logic will ignore the interrupt signal issued by the subsidiary processing unit on completion of the task. Nevertheless, in that instance, the main processing unit will still be arranged to exit the power saving mode upon receipt of the notification derived from the interrupt signal. This provides a great deal of flexibility as to how the main processing unit can be arranged to react to completion of the task by the subsidiary processing unit. For example, if the appropriate interrupt is enabled, the main processing unit may be arranged to execute some exception routine upon receipt of the interrupt signal. Alternatively, if the relevant interrupt is disabled, the main processing unit may be arranged instead to merely exit the power saving mode upon receipt of the notification, and continue is normal operation. Typically, that normal operation may involve the resumption of the polling process that was taking place at the time the power saving mode was entered.

As an alternative to the main processing unit being programmed to enable or disable interrupt processing the data processing apparatus may further comprise an interrupt controller associated with the main processing unit and operable to receive interrupt signals issued to the main processing unit from the subsidiary processing unit or from other interrupt sources, the interrupt controller being programmable to either enable or disable interrupt signals from each interrupt source so as to control which interrupt signals the main processing unit is to perform interrupt processing in response to.

In one embodiment, the main processing unit has control storage which is set when the notification is received. This enables a notification to be buffered at the main processing unit, such that the main processing unit can then determine from the value in the control storage whether a notification has been received by it. This is particularly useful in the situation where the subsidiary processing unit completes the task (and hence issues the notification) between the time the main processing unit polls the completion field and determines that the task has not completed, and the time that the main processing unit enters the power saving mode. The use of the control storage avoids the possibility of the notification in such a situation being overlooked.

It will be appreciated that there are a number of ways in which the main processing unit may enter the power saving mode. However, in one embodiment, if on polling the completion field the threshold number of times the main processing unit determines that the task has not been completed, the main processing unit is operable to execute a wait for notification instruction to cause said power saving mode to be entered. Hence, in accordance with this embodiment, the main processing unit is arranged to execute a specific instruction which causes the power saving mode to be entered, until such time as a notification is received.

In one particular embodiment where the control storage is provided within the main processing unit, the main processing unit is operable, upon execution of the wait for notification instruction, to check whether the control storage has been set, and if so to prevent the power saving mode being entered. Instead, if it is determined that the control storage has been set, the processor can be arranged to merely clear the control storage and resume normal operation, for example by re-polling the completion field. This hence avoids the main processing unit incorrectly entering the power saving mode.

In certain embodiments other actions (other than receipt of the notification) could also be used to cause the main processing unit to exit the power saving mode. For example, in one embodiment, the main processing unit, when in the power saving mode, is operable to exit the power saving mode if an exception is received by that main processing unit. Such an exception may for example be an enabled (i.e. non-masked) interrupt, an imprecise data abort, etc. By allowing the main processing unit to exit the power saving mode in this way, this enables the main processing unit to handle interrupts or other exceptions without impacting the latency.

Whilst in some embodiments, there may be just a single subsidiary processing unit, in other embodiments the data processing apparatus may comprise a plurality of said subsidiary processing units, each subsidiary processing unit being operable to perform an associated task on behalf of the main processing unit, and each subsidiary processing unit being operable to set an associated completion field when said associated task has been completed.

In such embodiments, the main processing unit may be arranged to poll one or more completion fields in order to determine whether the associated one or more tasks have been completed, and if on polling the one or more completion fields the threshold number of times the main processing unit determines that none of the one or more associated tasks have been completed, the main processing unit can then be arranged to enter the power saving mode. Each subsidiary processing unit is operable, when its associated task has been completed, to cause the notification to be issued on the path interconnecting the main processing unit and the subsidiary processing unit, and the main processing unit is operable, upon receipt of the notification, to exit the power saving mode, and to poll the one or more of the completion fields in order to determine whether any of the associated one or more tasks have been completed.

In such embodiments, the notification will typically not provide any indication as to which task it relates, and hence it is appropriate for the main processing unit, on exiting the power saving mode, to poll the one or more relevant completion fields since it may be the case that the notification relates to a task that is not currently to be polled by the main processing unit.

In one embodiment, each subsidiary processing unit is operable on completion of its associated task to issue an associated interrupt signal over an associated interrupt path, each path interconnecting the main processing unit and one of the subsidiary processing units incorporating the associated interrupt path, and the notification being derived from the associated interrupt signal, the data processing apparatus further comprising: an interrupt controller operable to receive the interrupt signals generated by each subsidiary processing unit, the interrupt controller being programmable to either enable or disable interrupt signals from each subsidiary processing unit. In such embodiments, each of the subsidiary processing units can issue interrupt signals over their associated interrupt path, and the interrupt controller will determine based on the received interrupt signals whether it is appropriate to assert an interrupt to the main processing unit.

In such embodiments, the data processing apparatus may further comprise notification generation logic operable to receive the interrupt signals issued by each subsidiary processing unit and to generate the notification upon receipt of any such interrupt signal. Since the notification will not typically include any information about the task to which it relates, the notification generation logic can be arranged merely to generate a notification upon receipt of any interrupt signals. The notification may take a different form to the interrupt signal that causes its generation. In particular, in one embodiment, an interrupt signal is typically asserted and then kept asserted until that interrupt has been accepted by the main processing unit. However, the notification typically takes the form of a pulsed signal, and hence for example may be set for a single cycle and then reset.

Viewed from a second aspect, a method of manages polling in a data processing apparatus, the data processing apparatus having a main processing unit and a subsidiary processing unit for performing a task on behalf of the main processing unit, the method comprising the steps of: setting a completion field when said task has been completed by the subsidiary processing unit; arranging the main processing unit to poll the completion field in order to determine whether said task has been completed; if on polling the completion field a threshold number of times the main processing unit determines that the task has not been completed, causing the main processing unit to enter a power saving mode; when said task has been completed, issuing to the main processing unit a notification over a path interconnecting the main processing unit and the subsidiary processing unit; and upon receipt of said notification at the main processing unit, exiting said power saving mode.

BRIEF DESCRIPTION OF THE DRAWINGS

FIG. 4 is an example of an instruction sequence that can be executed in order to implement the process of FIG. 2.

DETAILED DESCRIPTION

Figure 1:
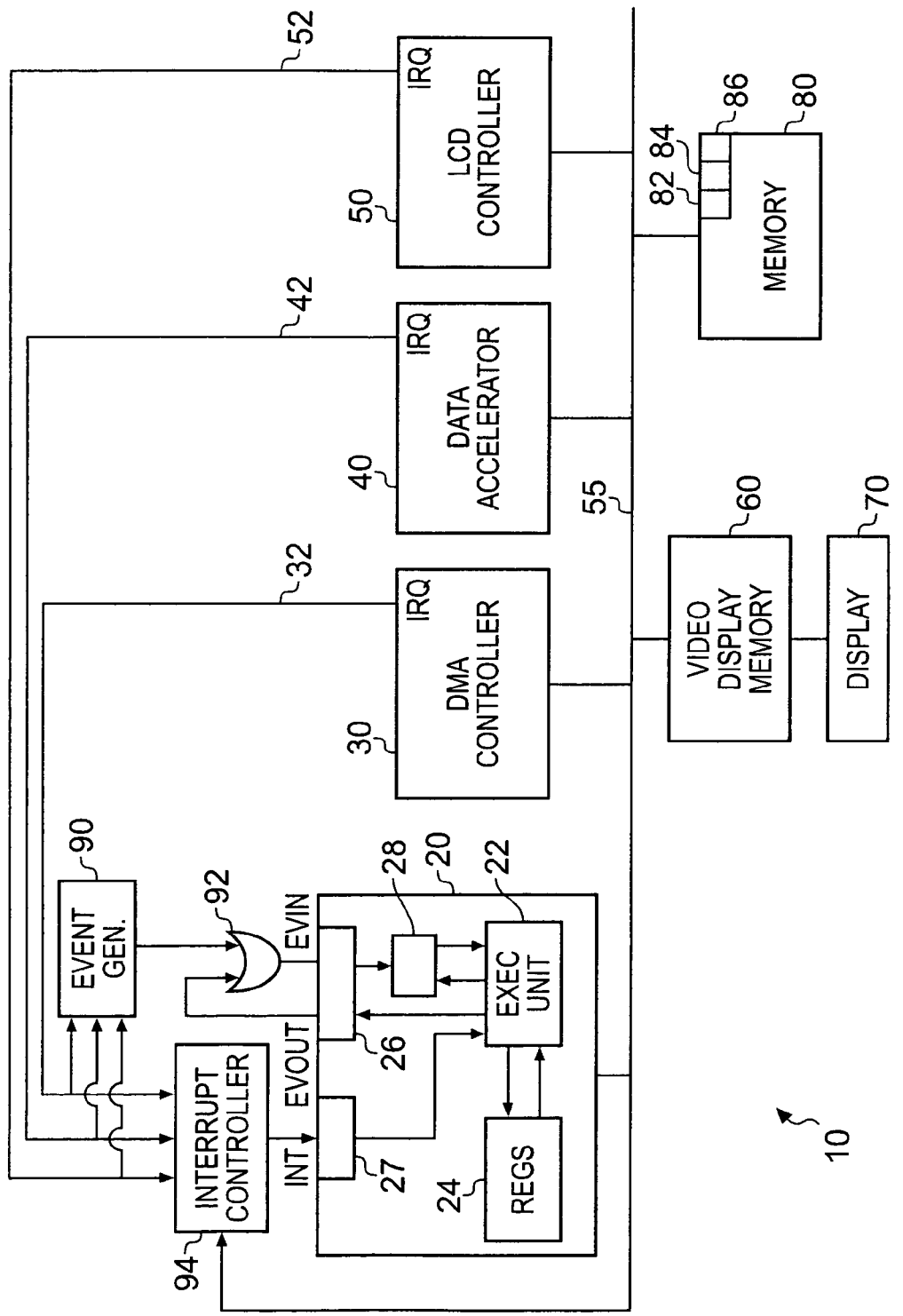
FIG. 1 is a block diagram of a data processing apparatus in accordance with an embodiment of the present invention.

FIG. 1 is a block diagram of a data processing apparatus 10 comprising a main processing unit 20, for example a CPU, and a number of subsidiary processing units 30, 40, 50, which are coupled via a bus 55 with a general purpose memory 80 and video display memory 60. The video display memory 60 is coupled to a display device 70 for the display of image data stored within the video display memory 60. In one particular embodiment, all of the components illustrated in FIG. 1, other than the display device 70, may be provided as a System-on-Chip (SoC).

The main processing unit incorporates an execution unit 22 coupled to a set of working registers 24. The execution unit 22 can execute data processing operations on data values held within the working registers 24. Data values can be loaded into the working registers 24 from the memory 80, or stored from the working registers 24 to the memory 80, through the execution of load and store instructions, respectively. These instructions, and indeed any other instructions required to be executed by the execution unit 22, can be loaded into the processing unit 20 from memory 80.

Whilst the main processing unit 20 can perform a variety of data processing operations, there are certain tasks which it can delegate to one of the special-purpose hardware units 30, 40, 50 to perform on its behalf. In particular, the DMA controller 30 may be used to manage data transfer operations on behalf of the main processing unit 20. These data transfer operations may involve the transfer of data between devices residing on the bus 55 or the transfer of data from one of those devices to an external device (not shown) via an input/output port. The data accelerator 40 may be used to perform certain video processing functions on behalf of the main processing unit 20. Such video processing functions are often very processing intensive tasks, and the data accelerator 40 can be arranged to perform those tasks in a more optimised way than if they were performed on the general purpose processing unit 20. The LCD controller 50 can be used to control the displaying of image data on the display 70, thereby relieving the main processing unit 20 from that task.

Hence, considering an example scenario, the main processing unit 20 may request the data accelerator 40 to perform some video processing functions on some raw video data stored in memory 80. Once this task has completed, the main processing unit 20 may then arrange for the DMA controller 30 to control the transfer of that processed video data to the video display memory 60. Upon completion of that task, the main processing unit 20 may delegate to the LCD controller 50 the task of controlling the output of that video from the video display memory 60 to the display device 70.

It will be appreciated that when using the subsidiary processing units in this way, the main processing unit 20 needs to know when a task allocated to one of the subsidiary processing unit has been completed. To achieve this, each of the subsidiary processing units 30, 40, 50 has a corresponding completion flag 82, 84, 86 provided within the memory system, for example within the memory 80, and when a particular subsidiary processing unit completes a task allocated to it, it sets its associated completion flag. The main processing unit 20 can then be arranged to poll the status of these completion flags by issuing the appropriate memory access requests over the bus 55. If on polling a particular completion flag, the processing unit determines that that flag has been set, then this indicates that the task has been completed by the associated subsidiary processing unit.

Another mechanism that can be used for communication between the subsidiary processing units 30, 40, 50 and the main processing unit 20 is an interrupt mechanism, and in the particular embodiment illustrated in FIG. 1 each subsidiary processing unit 30, 40, 50 has an associated interrupt path 32, 42, 52 over which it may issue an interrupt signal to the main processing unit 20.

As is known in the art, an interrupt controller 94 can be provided for receiving the various interrupt signals issued by the subsidiary processing units, and for controlling the assertion of an interrupt to the main processing unit 20 dependent on the interrupt signals received. The interrupt controller 94 can be programmed by the main processing unit 20 via the bus 55 so as to disable, or "mask", certain interrupts. If the interrupt controller 94 determines based on its input signals that an interrupt should be asserted to the processing unit 20, then this interrupt is output from the interrupt controller and received at the port 27 of the main processing unit. Upon receipt of such an interrupt, the main processing unit is arranged to halt its current processing activities, and to branch to an interrupt handling routine to process the interrupt in the required manner.

In one embodiment, each of the subsidiary processing units 30, 40, 50 is arranged to issue an interrupt when it completes execution of a task allocated to it. The main processing unit 20 can control whether it is notified of those interrupts by appropriate programming of the interrupt controller 94. It will be appreciated that interrupts are by their nature very invasive to the processor 20, since they will cause the processor to stop what it is currently doing and initiate an interrupt handling routine. For certain tasks, this may be the appropriate mechanism to invoke upon completion of that task by the relevant subsidiary processing unit. However, for other tasks, it may be more efficient for the main processing unit to employ the less invasive technique of periodically polling the completion fields to determine when a particular task has been completed.

However, the use of the polling mechanism to periodically poll the completion field to determine completion of a task can give rise to significant power inefficiency, since a polling loop may need to be performed a significant number of times before it is finally determined that a particular task has been completed. Furthermore, each time the completion flag is to be polled, a memory access request has to be issued over the bus 55, and this can increase the likelihood of contention for access to the bus amongst the various devices connected to that bus.

In accordance with embodiments of the present invention, this problem is alleviated by arranging the main processing unit 20 to enter a power saving mode if, on polling the completion field, it is determined that the task has not been completed. This avoids repetition of the polling loop unnecessarily. Each subsidiary processing unit is then arranged to issue a notification to the main processing unit when it has completed execution of the task, and receipt of this notification causes the main processing unit to exit the power saving mode. In the embodiment illustrated in FIG. 1, advantage is taken of the pre-existing interrupt paths 32, 42, 52 for transmittal of the required notification.

More particularly, each of the subsidiary processing units 30, 40, 50 issues an interrupt signal over its associated interrupt path 32, 42, 52 when it completes execution of a task, and event generation logic 90 is arranged to receive any such interrupt signals issued. Upon receipt of any interrupt signal, the event generation logic 90 is then arranged to generate a notification, which is routed via OR gate 92 to an event input pin (EVIN) of port 26 of the main processing unit 20. In addition to notifications issued by the event generation logic 90, the OR gate 92 is also arranged to receive any notification issued by the execution unit 22 to an event output pin (EVOUT) of the port 26. By allowing the execution unit 22 to issue a notification in certain situations, this enables the main processing unit 20 to prevent entry into the power saving mode if required, even in the absence of a notification generated by any of the subsidiary processing units 30, 40, 50.

The main processing unit 20 also has an event register 28 provided therein which is set upon receipt of a notification at the EVIN pin of the processor. The way in which this event register is used will be described in more detail later.

Figure 2:
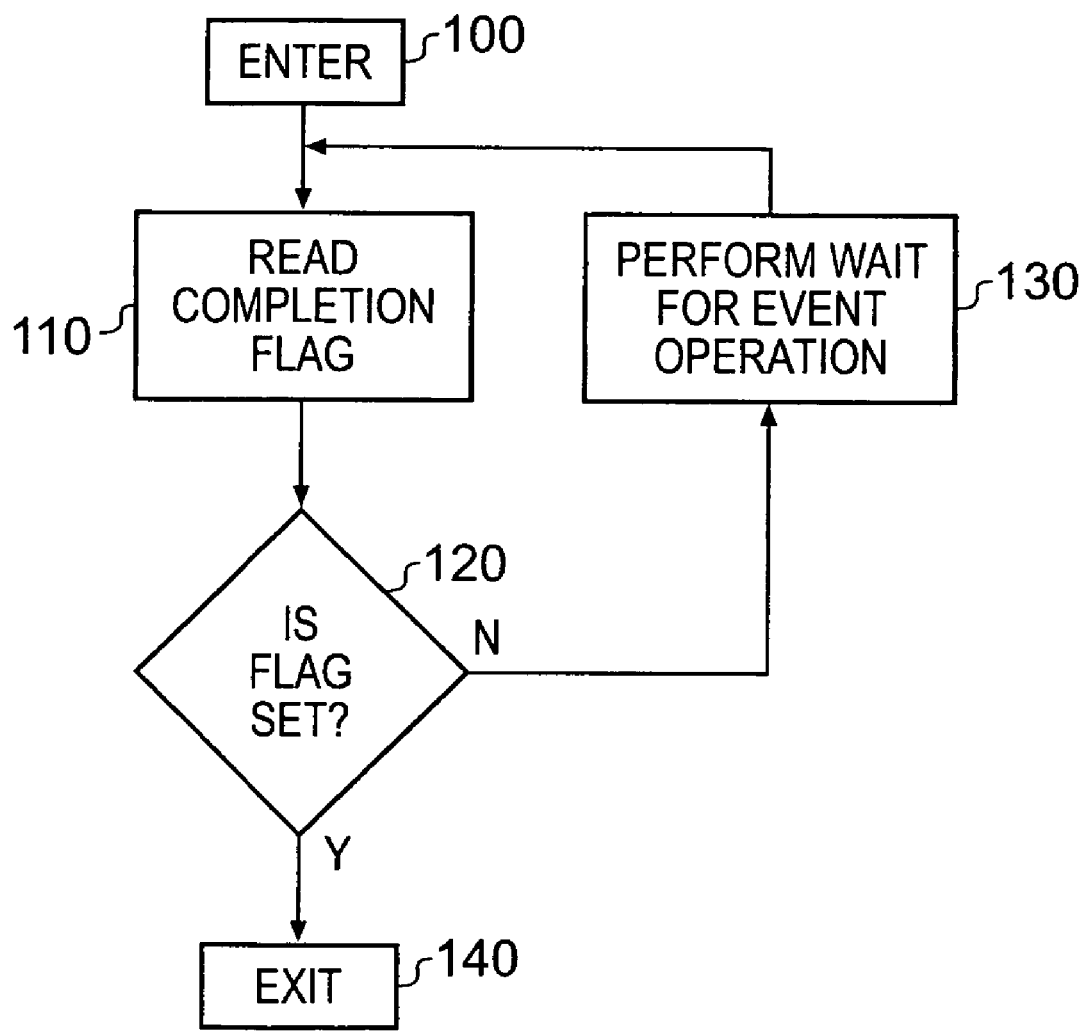
FIG. 2 is a flow diagram illustrating a sequence of steps performed by the main processing logic in accordance with one embodiment of the present invention.

FIG. 2 is a flow diagram of a process that may be performed on the main processing unit 20 in order to determine completion of a particular task by one of the subsidiary processing units 30, 40, 50, based on polling the relevant completion flag 82, 84, 86. The process starts at step 100, and at step 110 the appropriate completion flag is read via the bus 55. At step 120, it is then determined whether the flag is set, indicating completion of the task. If not, the process branches to step 130, where a wait for event operation is performed by the main processing unit 20. This operation will be discussed in more detail later with reference to FIG. 3. On exiting the wait for event operation, the process then returns to step 110. When at step 120 it is determined that the flag has been set, the process then proceeds to step 140 where the process completes.

Figure 3:
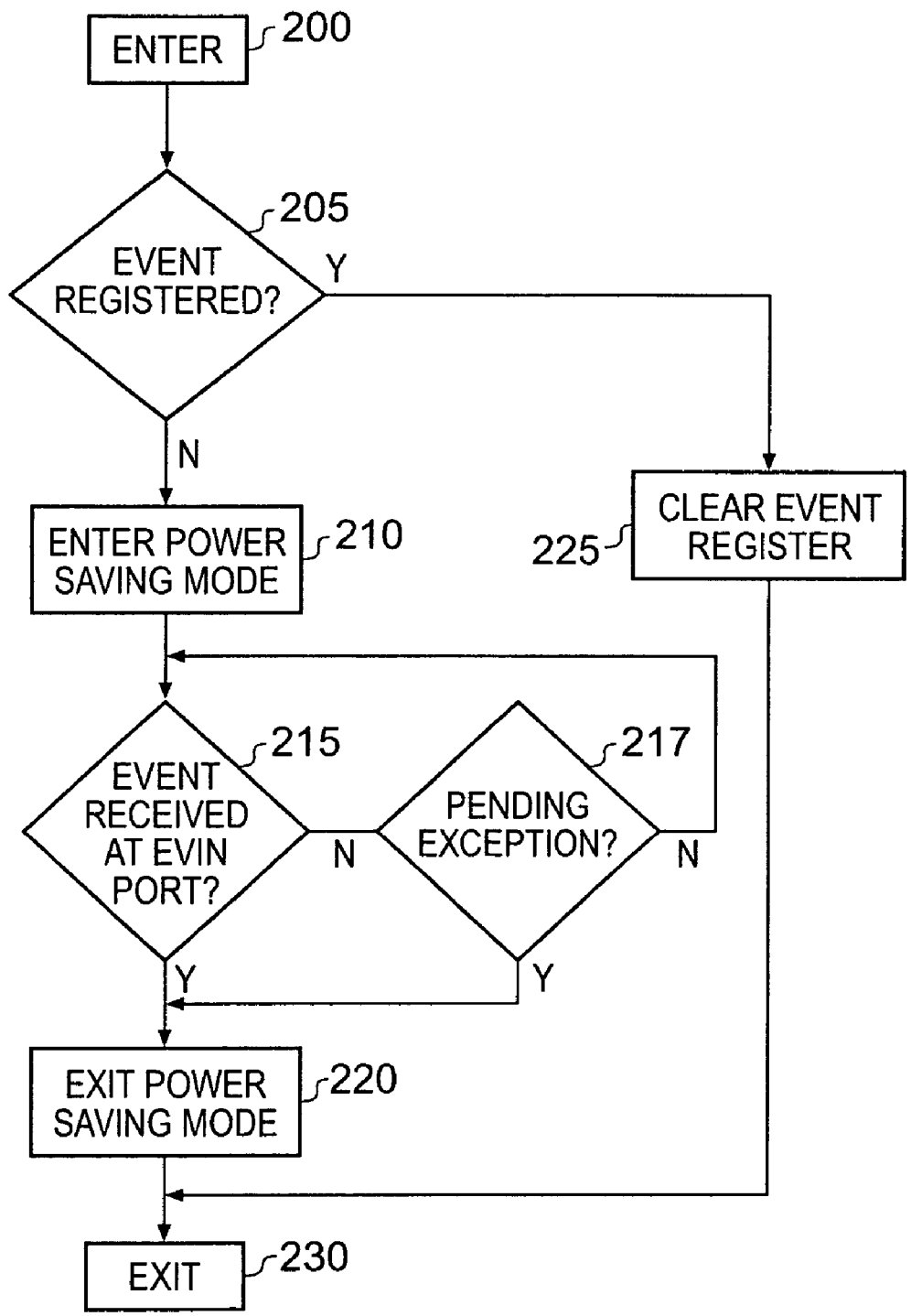
FIG. 3 is a flow diagram illustrating the steps performed in order to implement the wait for event operation of FIG. 2.

FIG. 3 is a flow diagram illustrating in more detail the steps performed when executing the wait for event operation at step 130 of FIG. 2. At step 200, the process is entered, and at step 205 it is determined whether an event has been registered in the event register 28 of the main processor 20. In one embodiment, following exiting of the power saving mode, this will always be the case the first time the wait for event operation is subsequently triggered, since in that embodiment the event register is not cleared on exiting the power saving mode. This may, for example, also be the case if, whilst the processor was performing steps 110 and 120 of FIG. 2, one of the subsidiary processing units had completed its allocated task, and accordingly issued an interrupt signal over its associated interrupt path, giving rise to the generation of a notification by the event generation logic 90. If it is determined at step 205 that an event has been registered in the event register, then the event register is cleared at step 225, and the process exits at step 230. With reference to FIG. 2, it can be seen that in this instance the process returns directly to step 110 to cause the completion flag to be polled again. This may or may not result in the main processing unit determining at step 120 that the flag has been set, but if it does not it can be seen from FIG. 2 that the process will loop back to the wait for event operation again.

If at step 205 it is determined that a notification is not registered in the event register, then the process proceeds to step 210, where the main processing unit enters a power saving mode. In one embodiment, this power saving mode places the main processing unit in as low a power state as possible consistent with a fast wake up without the need for software state restoration. Thereafter, the process proceeds to step 215, where it is determined whether a notification has been received at the EVIN port of the main processing unit 20. If not, the process proceeds to step 217 where it is determined whether there is a pending exception. Such an exception may for example be an enabled (i.e. non-masked) interrupt received at port 27, an imprecise data abort, etc. The provision of such a step is beneficial since it enables the processor to be able to handle interrupts or other exceptions without impacting the latency. In the event that no such exception is detected at step 217, the process returns to step 215.

Once either receipt at the EVIN port of a notification event is detected at step 215, or a pending exception is detected at step 217, the process proceeds to step 220, to cause the power saving mode to be exited. Thereafter, the wait for event operation exits at step 230. With reference to FIG. 2, it can be seen that, if the power saving mode was exited due to receipt of a notification at step 215, the process then returns to step 110 to cause the completion flag to be once again polled. If the power saving mode were instead exited due to a pending exception being detected at step 217, the main processing unit can then perform the necessary functions to handle that exception, for example by running an exception routine. Once this exception routine has been completed, the main processing unit may in due course return to execution of the original routine that was seeking to poll the completion flag. When this happens, the main processing unit will re-perform steps 110 and 120 in order to determine whether the task has been completed by the relevant subsidiary processing unit, and only if the task is still uncompleted at that time will the processor then re-perform the wait for event routine at step 130.

It will be noted from FIG. 3 that in the embodiment illustrated therein the notification event detected at step 215, and causing the power saving mode to be exited, is not automatically cleared from the event register on exiting the power saving mode. Hence, when the processor does next re-perform the wait for event routine at step 130, processing will proceed through steps 200, 205, 225 and 230 to cause the event register to be cleared. With reference to FIG. 2, it will be seen that the result of this is that once the power saving mode has been exited, the completion flag needs to be polled twice without it being determined that the task has been completed before the power saving mode is again entered.

It will be appreciated that the technique described above with reference to FIGS. 2 and 3 results in significant power savings when compared with a traditional prior art approach, where the main processing unit would repeatedly poll the relevant completion field until it was determined that the completion flag had been set. Instead, the main processing unit enters a power saving mode and waits to be woken up by receipt of a notification indicating that one of the subsidiary processing units has completed its allocated task.

It will be appreciated that in certain embodiments other actions could also be used to cause the main processing unit to exit the power saving mode. For example, the main processing unit may be arranged to exit the power saving mode if a debug entry request is received by the main processing unit 20.

It will be appreciated that since the notification is generated by the event generation logic 90 whenever an interrupt signal is received over any of the paths 32, 42, 52, the receipt of the notification by the main processing unit 20 does not necessarily indicate that the task that the main processing unit was polling the completion field for has been completed. For example, the main processing unit 20 may have entered the power saving mode due to the fact that a particular task allocated to the DMA controller 30 had not completed. The main processing unit 20 will exit the power saving mode upon receipt of the notification, which might for example have arisen due to either the data accelerator 40 or the LCD controller 50 completing a particular allocated task. This is the reason why in FIG. 2, upon exiting the wait for event operation, the main processing unit is arranged to again poll the completion flag of interest to it in order to determine whether the relevant task has been completed.

In an alternative embodiment, the notifications could themselves be unique to particular subsidiary processing units, such that the main processing unit would be arranged to only exit the power saving mode if the notification related to a task whose completion the main processing unit was awaiting. However, this would increase the complexity of the mechanism, and hence in the FIG. 1 embodiment the simpler mechanism is employed where any notification will cause the main processing unit to exit the power saving mode. It is envisaged that in most embodiments this simple mechanism will be sufficient to give rise to significant power savings.

Figure 4:
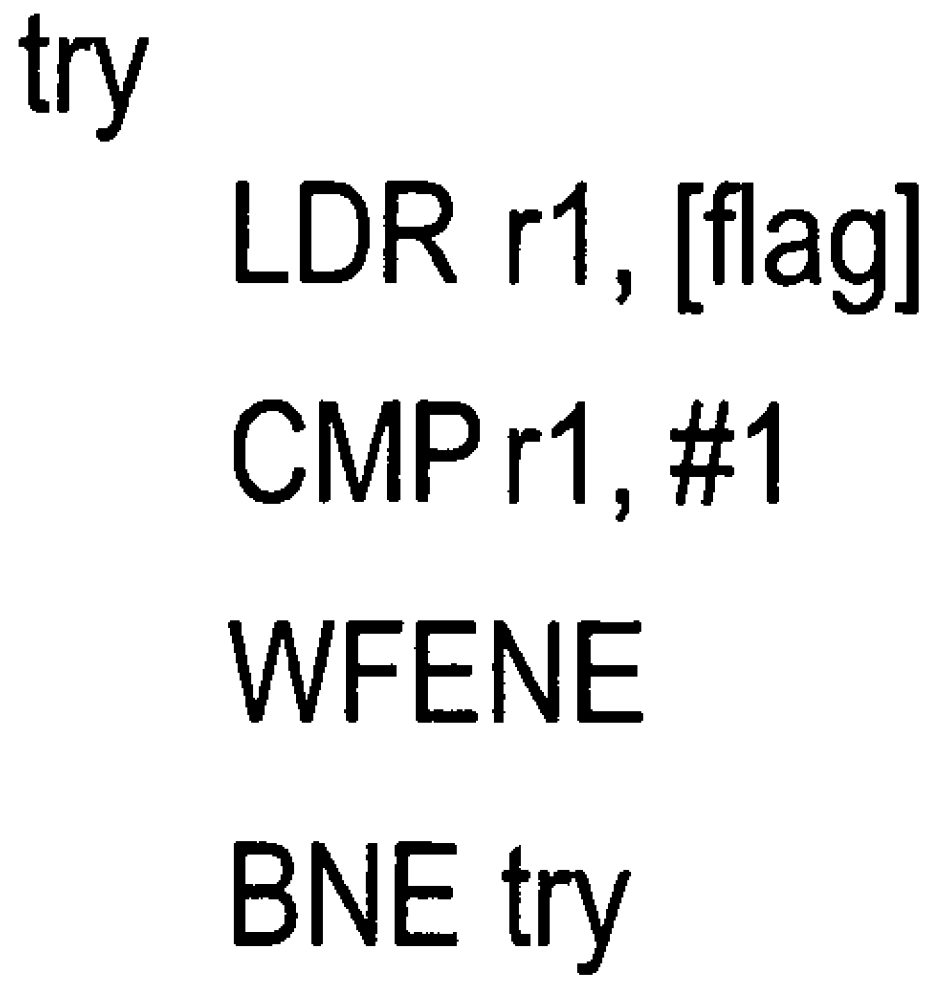

FIG. 4 illustrates a sequence of instructions that may be executed to implement the process of FIG. 2. Firstly, a load instruction is performed to load the contents of the relevant completion flag 82, 84, 86 into register r1 (one of the working registers 24 of the main processing unit 20). Thereafter, a compare instruction is executed to determine whether the contents of the register r1 are equal to one, i.e. to determine whether the completion flag has been set (in this embodiment it is envisaged that the completion flag is set to a logic one value and reset to a logic zero value).

If the result of the comparison operation is that the value in register r1 is determined not to be equal to one, then a wait for event instruction is executed conditionally to implement the process of FIG. 3. Once the wait for event operation has completed execution, then a branch instruction is executed to loop the processing back to the load instruction. It will be appreciated that if the result of the comparison operation is that the value in register r1 is determined to be equal to one (i.e. indicating that the completion flag is set), then the wait for event instruction and the branch instruction are not executed, and instead processing proceeds to a subsequent instruction (not shown).

In certain embodiments, the main processing logic 20 may be arranged to monitor more than one completion flag at a time, and hence as an example may wish to know when either the task performed by the DMA controller 30 or the task performed by the data accelerator 40 have completed. In such situations, the main processing logic 20 may be arranged to enter the power saving mode if on polling the relevant two completion flags 82, 84, it is determined that neither of the two tasks have been completed. Upon receipt of a notification indicating completion of a task allocated to any of the subsidiary processing units 30, 40, 50, the main processing unit will then be arranged to exit the power saving mode and re-poll the relevant completion fields 82, 84. With reference to the earlier described FIG. 2, it will be appreciated that in this instance the flow will be modified such that the wait for event operation is only performed if on reading both completion flags 82, 84, it is determined that neither flag is set.

As will be appreciated from the above description, the technique of embodiments of the present invention provides a mechanism to allow the main processing unit to enter a low power state whilst awaiting completion of a task by a particular subsidiary processing unit. When a notification is issued indicating completion of a task by one of the subsidiary processing units, this causes the main processing unit to wake up and re-poll the relevant completion flag.

The non-limiting technique of the above described example embodiment uses hardware and software to achieve the energy saving. The hardware provides a path to enable a notification to be input to the main processing unit upon completion of a task by any of the subsidiary processing units, with the main processing unit being provided with a register which can be set to indicate whether a notification has been received. The hardware hence provides the mechanism to enter the low power state, and the operating system software is responsible for issuing wait for event instructions to cause the low power state to be entered at the appropriate points.

Although particular example embodiments have been described herein, it will be appreciated that the invention is not limited thereto and that many modifications and additions thereto may be made within the scope of the appended claims.

We claim:

1. A data processing apparatus comprising:
   a main processing unit;
   a subsidiary processing unit configured to perform a task on behalf of the main processing unit;
   the subsidiary processing unit being configured to set a completion field when said task has been completed and the main processing unit being configured to poll the completion field in order to determine whether said task has been completed;
   if on polling the completion field a threshold number of times the main processing unit determines that the task has not been completed, the main processing unit being configured to enter a power saving mode;
   the subsidiary processing unit being configured, when said task has been completed, to cause a notification to be issued on a path interconnecting the main processing unit and the subsidiary processing unit;
   the main processing unit being configured, upon receipt of said notification, to exit said power saving mode.

2. A data processing apparatus as claimed in claim 1, wherein the subsidiary processing unit is configured on completion of the task to issue an interrupt signal to the main processing unit over an interrupt path, said path interconnecting the main processing unit and the subsidiary processing unit incorporating the interrupt path, and the notification being derived from the interrupt signal.

3. A data processing apparatus as claimed in claim 2, wherein the main processing unit is programmable to either enable or disable interrupt processing in response to the interrupt signal, and wherein if interrupt processing is disabled, then the main processing logic is configured to ignore the interrupt signal and to exit the power saving mode upon receipt of the notification derived from the interrupt signal.

4. A data processing apparatus as claimed in claim 2, further comprising an interrupt controller associated with the main processing unit and configured to receive interrupt signals issued to the main processing unit from the subsidiary processing unit or from other interrupt sources, the interrupt controller being programmable to either enable or disable interrupt signals from each interrupt source so as to control which interrupt signals the main processing unit is to perform interrupt processing in response to.

5. A data processing apparatus as claimed in claim 1, wherein the main processing unit has control storage which is set when said notification is received.

6. A data processing apparatus as claimed in claim 1, wherein if on polling the completion field the threshold number of times the main processing unit determines that the task has not been completed, the main processing unit is configured to execute a wait for notification instruction to cause said power saving mode to be entered.

7. A data processing apparatus as claimed in claim 6, wherein the main processing unit has control storage which is set when said notification is received and wherein upon execution of the wait for notification instruction, the main processing unit is configured to check whether the control storage has been set and if so to prevent the power saving mode being entered.

8. A data processing apparatus as claimed in claim 1, wherein the main processing unit, when in said power saving mode, is configured to exit said power saving mode if an exception is received by that main processing unit.

9. A data processing apparatus as claimed in claim 1, comprising a plurality of said subsidiary processing units, each subsidiary processing unit being configured to perform an associated task on behalf of the main processing unit, and each subsidiary processing unit being configured to set an associated completion field when said associated task has been completed.

10. A data processing apparatus as claimed in claim 9, wherein:
the main processing unit is configured to poll one or more completion fields in order to determine whether said associated one or more tasks have been completed;
if on polling said one or more of the completion fields the threshold number of times the main processing unit determines that none of the one or more associated tasks have been completed, the main processing unit being configured to enter the power saving mode;
each subsidiary processing unit being configured, when its associated task has been completed, to cause the notification to be issued on the path interconnecting the main processing unit and that subsidiary processing unit;
the main processing unit being configured, upon receipt of said notification, to exit said power saving mode, and to poll said one or more of the completion fields in order to determine whether any of the associated one or more tasks have been completed.

11. A data processing apparatus as claimed in claim 9, wherein each subsidiary processing unit is configured on completion of its associated task to issue an associated interrupt signal over an associated interrupt path, each path interconnecting the main processing unit and one of the subsidiary processing units incorporating the associated interrupt path, and the notification being derived from the associated interrupt signal, the data processing apparatus further comprising:
an interrupt controller configured to receive the interrupt signals generated by each subsidiary processing unit, the interrupt controller being programmable to either enable or disable interrupt signals from each subsidiary processing unit.

12. A data processing apparatus as claimed in claim 11, further comprising notification generation logic configured to receive the interrupt signals issued by each subsidiary processing unit and to generate the notification upon receipt of any such interrupt signal.

13. A method of managing polling in a data processing apparatus, the data processing apparatus having a main processing unit and a subsidiary processing unit for performing a task on behalf of the main processing unit, the method comprising the steps of:
setting a completion field when said task has been completed by the subsidiary processing unit;
arranging the main processing unit to poll the completion field in order to determine whether said task has been completed;
if on polling the completion field a threshold number of times the main processing unit determines that the task has not been completed, causing the main processing unit to enter a power saving mode;
when said task has been completed, issuing to the main processing unit a notification over a path interconnecting the main processing unit and the subsidiary processing unit; and
upon receipt of said notification at the main processing unit, exiting said power saving mode.

14. A method as claimed in claim 13, further comprising the steps of:
on completion of the task by the subsidiary processing unit, issuing an interrupt signal to the main processing unit over an interrupt path, said path interconnecting the main processing unit and the subsidiary processing unit incorporating the interrupt path; and
deriving the notification from the interrupt signal.

15. A method as claimed in claim 14, wherein the main processing unit is programmable to either enable or disable interrupt processing in response to the interrupt signal, and wherein if interrupt processing is disabled, then the main processing logic ignores the interrupt signal and exits the power saving mode upon receipt of the notification derived from the interrupt signal.

16. A method as claimed in claim 14, further comprising the step of:
receiving, at an interrupt controller associated with the main processing unit, interrupt signals issued to the main processing unit from the subsidiary processing unit or from other interrupt sources, the interrupt controller being programmed to either enable or disable interrupt signals from each interrupt source so as to control which interrupt signals the main processing unit performs interrupt processing in response to.

17. A method as claimed in claim 13, further comprising the step of setting control storage within the main processing unit when said notification is received.

18. A method as claimed in claim 13, wherein if on polling the completion field the threshold number of times the main processing unit determines that the task has not been completed, the power saving mode is entered by causing the main processing unit to execute a wait for notification instruction.

19. A method as claimed in claim 18, further comprising the steps of:
setting control storage within the main processing unit when said notification is received; and
upon execution of the wait for notification instruction, checking whether the control storage has been set and if so preventing the power saving mode being entered.

20. A method as claimed in claim 13, wherein the main processing unit, when in said power saving mode, exits said power saving mode if an exception is received by that main processing unit.

21. A method as claimed in claim 13, wherein the data processing apparatus includes a plurality of said subsidiary processing units, each subsidiary processing unit being configured to perform an associated task on behalf of the main processing unit, and each subsidiary processing unit setting an associated completion field when said associated task has been completed.

22. A method as claimed in claim 21, wherein:
- the main processing unit polls one or more completion fields in order to determine whether said associated one or more tasks have been completed;
- if on polling said one or more of the completion fields the threshold number of times the main processing unit determines that none of the one or more associated tasks have been completed, the main processing unit enters the power saving mode;
- each subsidiary processing unit, when its associated task has been completed, causes the notification to be issued on the path interconnecting the main processing unit and that subsidiary processing unit;
- upon receipt of said notification, the main processing unit exits said power saving mode, and polls said one or more of the completion fields in order to determine whether any of the associated one or more tasks have been completed.

23. A method as claimed in claim 21, wherein each subsidiary processing unit, on completion of its associated task, issues an associated interrupt signal over an associated interrupt path, each path interconnecting the main processing unit and one of the subsidiary processing units incorporating the associated interrupt path, and the notification being derived from the associated interrupt signal, the method further comprising the step of:
- receiving the interrupt signals generated by each subsidiary processing unit at an interrupt controller, the interrupt controller being programmed to either enable or disable interrupt signals from each subsidiary processing unit.

24. A method as claimed in claim 23, further comprising the steps of:
- passing to notification generation logic the interrupt signals issued by each subsidiary processing unit; and
- causing the notification generation logic to generate the notification upon receipt of any such interrupt signal.

* * * * *